(12) United States Patent
Lee et al.

(10) Patent No.: US 9,729,072 B2
(45) Date of Patent: Aug. 8, 2017

(54) RESONANT CONVERTER AND DRIVING METHOD THEREOF

(71) Applicant: FAIRCHILD KOREA SEMICONDUCTOR LTD., Bucheon-si (KR)

(72) Inventors: Won-Tae Lee, Cheonan-si (KR); Hyeong Seok Baek, Bucheon-si (KR); Ji-Hoon Jang, Incheon (KR); Hang-Seok Choi, Bedford, NH (US); Moon-Ho Choi, Bucheon-si (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 0 days.

(21) Appl. No.: 14/619,201

(22) Filed: Feb. 11, 2015

(65) Prior Publication Data

US 2015/0229226 A1    Aug. 13, 2015

Related U.S. Application Data

(60) Provisional application No. 61/938,443, filed on Feb. 11, 2014.

(30) Foreign Application Priority Data

Jan. 12, 2015  (KR) .......................... 10-2015-0004390

(51) Int. Cl.
 *H02M 3/335*  (2006.01)
 *H02M 1/00*  (2006.01)

(52) U.S. Cl.
 CPC .................. *H02M 3/33592* (2013.01); *H02M 2001/0058* (2013.01); *Y02B 70/1433* (2013.01); *Y02B 70/1475* (2013.01); *Y02B 70/1491* (2013.01); *Y02P 80/112* (2015.11)

(58) Field of Classification Search
 CPC ......... H02M 3/33546; H02M 3/33592; H02M 2001/0058; Y02B 70/1433; Y02B 70/1475; Y02B 70/1491; Y02P 80/112
 See application file for complete search history.

(56) References Cited

U.S. PATENT DOCUMENTS

| | | | |
|---|---|---|---|
| 6,366,070 B1 | 4/2002 | Cooke et al. | |
| 8,624,572 B2 | 1/2014 | Hosotani | |
| 2003/0067794 A1 | 4/2003 | Boylan et al. | |

(Continued)

FOREIGN PATENT DOCUMENTS

| | | |
|---|---|---|
| CN | 101677215 | 3/2010 |
| CN | 101728956 | 6/2010 |
| CN | 103138588 | 6/2013 |

*Primary Examiner* — Jue Zhang

(57) ABSTRACT

A resonant converter includes a first switch on a primary side and a second switch coupled to the first switch, a first synchronous rectification switch on a secondary side conducted according to a switching operation of the first switch, a second synchronous rectification switch on the secondary side conducted according to a switching operation of the second switch, and a switch control circuit configured to detect a waveform of one end voltage of at least one of the first synchronous rectification switch and the second synchronous rectification switch, determine one of a below region and an above region, and differently control conduction duration of the first and second synchronous rectification switches according to a determined result.

20 Claims, 5 Drawing Sheets

(56) References Cited

U.S. PATENT DOCUMENTS

| | | |
|---|---|---|
| 2004/0105280 A1 | 6/2004 | Odaka |
| 2008/0055942 A1* | 3/2008 | Tao .................. H02M 3/33592 |
| | | 363/21.03 |
| 2008/0186742 A1 | 8/2008 | Seong |
| 2009/0175056 A1* | 7/2009 | Choi ................. H02M 3/33569 |
| | | 363/21.06 |
| 2009/0196074 A1 | 8/2009 | Choi |
| 2009/0251925 A1 | 10/2009 | Usui et al. |
| 2010/0067262 A1 | 3/2010 | Chen et al. |
| 2010/0172157 A1 | 7/2010 | Chen et al. |
| 2011/0080757 A1 | 4/2011 | Young |
| 2011/0150521 A1 | 6/2011 | Uchiyama et al. |
| 2011/0211370 A1* | 9/2011 | Luo .................. H02M 3/33592 |
| | | 363/21.02 |
| 2013/0336017 A1 | 12/2013 | Uno et al. |
| 2015/0023062 A1* | 1/2015 | Hyugaji et al. ................. 363/16 |

\* cited by examiner

RESONANT CONVERTER AND DRIVING METHOD THEREOF

CROSS-REFERENCE TO RELATED APPLICATION

This application claims priority to and the benefits of U.S. Patent Application No. 61/938,443 filed in the USPTO on Feb. 11, 2014, and Korean Patent Application No. 10-2015-0004390, filed with the Korean Intellectual Property Office on Jan. 12, 2015, the entire contents of which are incorporated herein by reference.

BACKGROUND (a) Technical Field

Embodiments relate to a resonant converter and a method of driving the same.

(b) Description of the Related Art

A resonant converter is controlled so as to operate in an inductive region in a DC gain characteristic according to an operating frequency. The inductive region is classified based on the resonant frequency, into a below resonance region having a frequency lower than a resonant frequency and an above resonance region having a frequency higher than the resonant frequency. When the resonant converter operates at a band higher than the resonant frequency, conduction loss may be increased.

SUMMARY

Embodiments are directed to providing a resonant converter capable of reducing conduction loss and a method of driving the same.

One aspect of the embodiment provides a resonant converter including: a first switch on a primary side and a second switch coupled to the first switch; a first synchronous rectification switch on a secondary side conducted according to a switching operation of the first switch; a second synchronous rectification switch on the secondary side conducted according to a switching operation of the second switch; and a switch control circuit which detects a waveform of one end voltage of at least one of the first synchronous rectification switch and the second synchronous rectification switch, determines one of a below region and an above region, and differently controls conduction duration of the first and second synchronous rectification switches according to a determined result.

The switch control circuit determines an operation region of the resonant converter to be the below region when ringing of the at least one end voltage occurs, and determines the operation region of the resonant converter to be the above region when the ringing does not occur.

In the above region, the switch control circuit extends the conduction duration of the first and second synchronous rectification switches to a time later than corresponding one of off times of the first switch and the second switch.

The switch control circuit comprises a mode selector configured to count a result of comparing the at least one end voltage with a predetermined threshold voltage and to select a mode according to a counted result.

The mode selector includes a level detector configured to detect a waveform level of the at least one end voltage and output a result of comparing with the threshold voltage, and a level counter configured to determine that ringing has not occurred when the result of counting a change in output of the level detector is smaller than a predetermined value and select a first mode, and determine that the ringing has occurred when the result of counting is equal to, or greater than the predetermined value and select a second mode.

The switch control circuit turns on the first synchronous rectification switch for a duration spanning from conduction time of the first synchronous rectification switch to a time delayed from turn-off time of the first switch by first extended duration calculated in an immediately preceding switching cycle and turns on the second synchronous rectification switch for a duration spanning from conduction time of the second synchronous rectification switch to a time delayed from turn-off time of the second switch by second extended duration calculated in the immediately preceding switching cycle, when an operation region of the resonant converter is the above region.

The switch control circuit calculate the first extended duration by subtracting first duration and dead time between the first and second synchronous rectification switches from duration spanning from turn-on time of the first switch to conduction end time of the first synchronous rectification switch, in which the first duration is calculated by subtracting dead time of the first and second switches from maximum on-time of the first switch.

The switch control circuit counts enabled duration of a clock signal which determines a switching frequency of the first and second switches, and the enabled duration of the clock signal corresponds to the maximum on-time of the first switch.

The switch control circuit calculates the second extended duration by subtracting first duration and dead time between the first and second synchronous rectification switches from duration spanning from turn-on time of the second switch to conduction end time of the second synchronous rectification switch, in which the first duration is calculated by subtracting dead time of the first and second switches from maximum on-time of the second switch.

The switch control circuit counts enabled duration of a clock signal which determines a switching frequency of the first and second switches, and the enabled duration of the clock signal corresponds to the maximum on-time of the second switch.

The switch control circuit includes an SR on-time determiner configured to detect an end voltage of the first synchronous rectification switch and an end voltage of the second synchronous rectification switch, detect first conduction duration of the first synchronous rectification switch and second conduction duration of the second synchronous rectification switch in an immediately preceding switching cycle, and set on-time of each of the first and second synchronous rectification switches in a next switching cycle based on a duration obtained as a result of subtracting second dead time between the first and second synchronous rectification switches from the detected first and second conduction duration; and an SR on-time compensator configured to calculate first extended duration by subtracting first duration of the first synchronous rectification switch and the second dead time from duration spanning from turn-on time of the first switch to conduction end time of the first synchronous rectification switch, and calculate second extended duration in the immediately preceding switching cycle by subtracting first duration of the second synchronous rectification switch and the second dead time from duration spanning from turn-on time of the second switch to conduction end time of the second synchronous rectification switch.

The SR on-time compensator calculates the first duration of the first synchronous rectification switch based on a duration obtained as a result of subtracting first dead time of the first and second switches from maximum on-time of the first switch in the immediately preceding switching cycle, and calculates the first duration of the second synchronous rectification switch based on a duration obtained as a result of subtracting the first dead time from maximum on-time of the second switch in the immediately preceding switching cycle.

The switch control circuit additionally includes an SR control signal generator configured so that when the resonant converter operates in the above region, to the SR control signal generator turns on the first synchronous rectification switch for a duration spanning from conduction time of the first synchronous rectification switch to a time that is delayed from turn-off time of the first switch to the first extended duration, and turns on the second synchronous rectification switch for a duration spanning from conduction time of the second synchronous rectification switch to time delayed from turn-off time of the second switch to the second extended duration.

The SR control signal generator additionally includes an SR control signal generator configured so that when the resonant converter operates in the below region, the SR control signal generator turns on the first synchronous rectification switch for a duration spanning from the conduction time of the first synchronous rectification switch to time of elapsing the on-time of the first synchronous rectification switch set by the SR on-time determiner, and turns on the second synchronous rectification switch for a duration spanning from the conduction time of the second synchronous rectification switch to time of elapsing the on-time of the second synchronous rectification switch set by the SR on-time determiner.

In one embodiment, a method of driving a resonant converter including a first switch and a second switch on a primary side, and a first synchronous rectification switch and a second synchronous rectification switch on a secondary side, is provided. The method may include synchronizing, at the first synchronous rectification switch, with turn-on of the first switch and conducting, synchronizing, at the second synchronous rectification switch, with turn-on of the second switch and conducting, detecting a waveform of one end voltage of at least one of the first and second synchronous rectification switches and determining one of a below region and an above region, and differently controlling conduction duration of the first and second synchronous rectification switches according to a determined result.

The determining of one of the below region and the above region includes determining an operation region of the resonant converter to be the below region when ringing of the at least one end voltage occurs, and determining the operation region of the resonant converter to be the above region when the ringing does not occur.

The differently controlling of the conduction duration of the first and second synchronous rectification switches includes extending the conduction duration of the first and second synchronous rectification switches to a time later than corresponding one of off times of the first switch and the second switch, when the operation region of the resonant converter is the above region.

The differently controlling of the conduction duration of the first and second synchronous rectification switches additionally includes turning on the first synchronous rectification switch for duration spanning from conduction time of the first synchronous rectification switch to a time delayed from turn-off time of the first switch by first extended duration calculated in an immediately preceding switching cycle, when the operation region of the resonant converter is the above region.

When the operation region of the resonant converter is the above region, the differently controlling of the conduction duration of the first and second synchronous rectification switches additionally includes calculating first duration which is obtained as a result of subtracting dead time of the first and second switches from maximum on-time of the first switch; and calculating the first extended duration by subtracting the first duration and dead time between the first and second synchronous rectification switches from duration spanning from turn-on time of the first switch to conduction end time of the first synchronous rectification switch.

When the operation region of the resonant converter is the above region, the differently controlling of the conduction duration of the first and second synchronous rectification switches additionally includes turning on the second synchronous rectification switch for duration spanning from conduction time of the second synchronous rectification switch to a time delayed from turn-off time of the second switch by second extended duration calculated in an immediately preceding switching cycle.

When the operation region of the resonant converter is the above region, the differently controlling of the conduction duration of the first and second synchronous rectification switches additionally includes calculating first duration which is obtained as a result of subtracting dead time of the first and second switches from maximum on-time of the second switch; and calculating the second extended duration by subtracting the first duration and the dead time between the first and second synchronous rectification switches from duration spanning from turn-on time of the second switch to conduction end time of the second synchronous rectification switch.

Embodiments provide a resonant converter capable of reducing conduction loss and a method of driving the same.

DETAILED DESCRIPTION OF THE EMBODIMENTS

Hereinafter, exemplary embodiments of the invention that are easily performed by those skilled in the art will be described in detail with reference to the accompanying drawings. However, exemplary embodiments of the invention may be implemented in many different forms and the invention is not limited to embodiments described herein. Further, unnecessary descriptions are omitted from the accompanying drawings in order to clearly describe the invention, and like numbers refer to like elements throughout the description of the drawings.

Throughout this specification, when a certain part is referred to as being "connected" to another part, it can be "directly connected" to another part or "electrically connected" by intervening of the other element. Further, when a certain part "includes" a certain component, unless otherwise defined, it means that another component may be further included rather than excluding the component.

Figure 1:
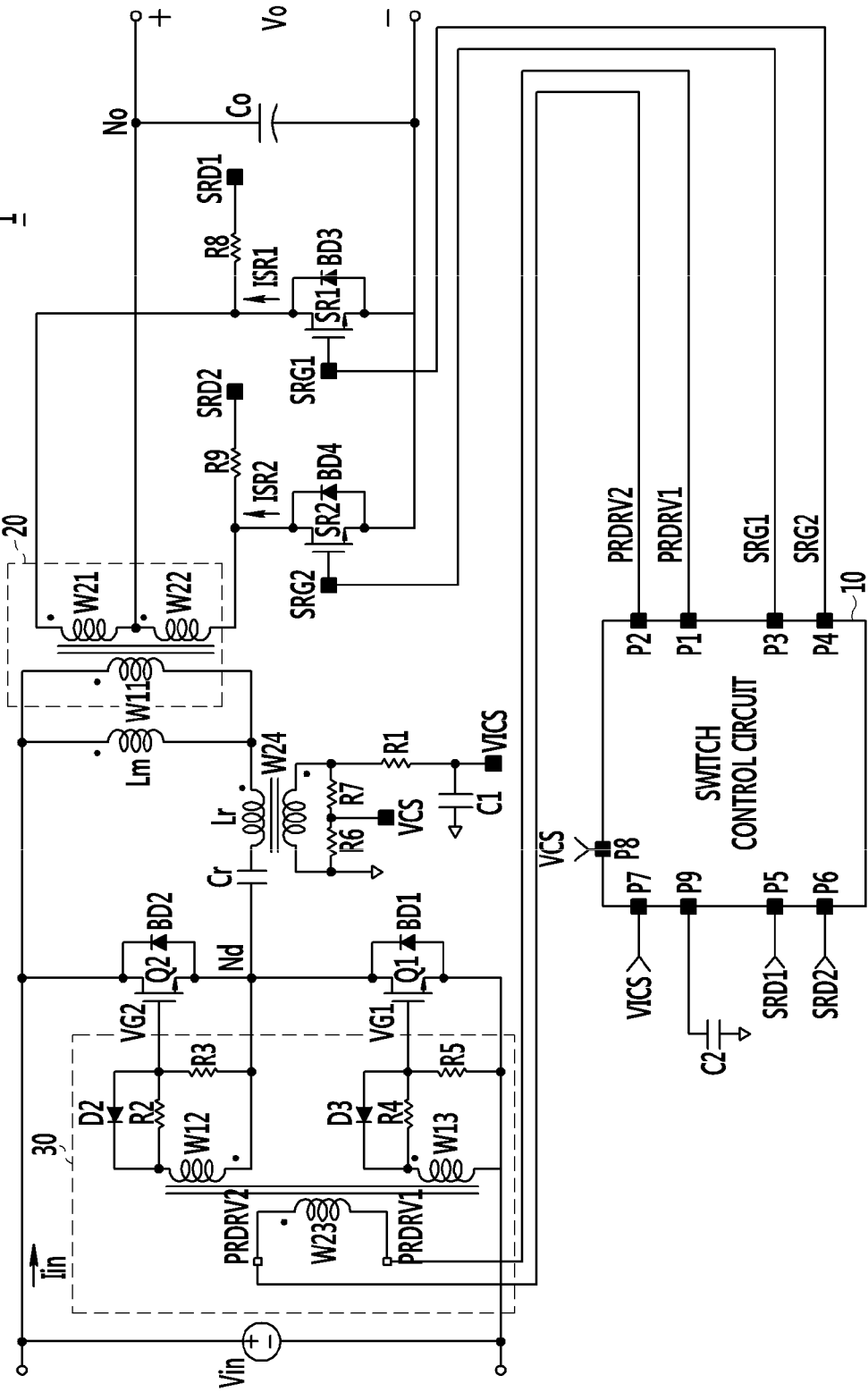
FIG. 1 is a circuit diagram of a resonant converter according to an embodiment of the invention.

FIG. 1 is a circuit diagram showing a resonant converter according to an embodiment of the invention.

The resonant converter shown in FIG. 1 is a half-bridge LLC resonant converter. However, a converter to which the invention may be applied is not limited thereto.

The resonant converter 1 includes a first switch Q1, a second switch Q2, a transformer 20, a gate drive circuit 30, a first synchronous rectification switch SR1, a second synchronous rectification switch SR2, and a switch control circuit 10.

Body diodes BD1 and BD2 are formed between drain and source of each of the first switch Q1 and the second switch Q2.

The second switch Q2 and the first switch Q1 are connected between an input voltage Vin and a primary side ground in series, and the second switch Q2 and the first switch Q1 operate to alternately switch. The second switch Q2 is turned off and then after first dead time, the first switch Q1 is turned on. The first switch Q1 is turned off and then after the first dead time, the second switch Q2 is turned on.

The drain of the second switch Q2 is connected to the input voltage Vin, the source of the second switch Q2 and the drain of the first switch Q1 are connected at a node Nd, and the source of the first switch Q1 is connected to the primary side ground. Gate voltages VG1 and VG2 are supplied to gates of the first switch Q1 and the second switch Q2, respectively. The first switch Q1 and the second switch Q2 are alternately switched and power supply is controlled according to the switching operation. For example, the power supply is increased as a switching frequency of the first switch Q1 and the second switch Q2 is decreased, and the power supply is decreased as the switching frequency is increased.

A capacitor Cr, a primary side winding W11 of the transformer 20, and an inductor Lr are connected between the input voltage Vin and the node Nd in series. Resonance occurs between the capacitor Cr, the primary side winding W11, and the inductor Lr, and a current Iin which is input to a primary side is controlled to be a sinusoidal wave by the resonance.

A winding W21 and a winding W22 are insulated and coupled on a secondary side of the transformer 20 at a predetermined winding ratio with respect to the primary side winding W11. The first synchronous rectification switch SR1 is connected to one end of the secondary side winding W21 and a body diode BD3 is formed between drain and source of the first synchronous rectification switch SR1. The second synchronous rectification switch SR2 is connected to one end of the secondary side winding W22 and a body diode BD4 is formed between drain and source of the second synchronous rectification switch SR2.

Hereinafter, when current flows through the first and second synchronous rectification switches SR1 and SR2, it means that the current flows through not only the first and second synchronous rectification switches SR1 and SR2 upon turning on of the first and second synchronous rectification switches SR1 and SR2, but also through the body diodes BD3 and BD4.

The source of the first synchronous rectification switch SR1 is connected to a secondary side ground, the drain thereof is connected to one end of the secondary side winding W21, and a first SR gate voltage SRG1 is input to the gate thereof. The source of the second synchronous rectification switch SR2 is connected to the secondary side ground, the drain thereof is connected to one end of the secondary side winding W22, and a second SR gate voltage SRG2 is input to the gate thereof.

The other end of the secondary side winding W21 and the other end of the secondary side winding W22 are connected to an output node No, and a capacitor Co is connected between the output node No and the secondary side ground. A voltage of the output node No is an output voltage Vo.

The body diode BD3 is conducted by a current which flows through the secondary side winding W21 and then the first synchronous rectification switch SR1 is turned on. Thus, the current of the secondary side winding W21 is rectified through the first synchronous rectification switch SR1 and then flows to the capacitor Co. Hereinafter, the current which flows through the first synchronous rectification switch SR1 is referred to as a "first synchronous rectification current ISR1".

The body diode BD4 is conducted by a current which flows through the secondary side winding W22 and then the second synchronous rectification switch SR2 is turned on. Thus, the current of the secondary side winding W22 is rectified through the second synchronous rectification switch SR2 and then flows to the capacitor Co. Hereinafter, the current which flows through the second synchronous rectification switch SR2 is referred to as a "second synchronous rectification current ISR2".

The first and second synchronous rectification currents ISR1 and ISR2 may be supplied to a load or may charge the capacitor Co. A ripple of the output voltage Vo is attenuated by the capacitor Co.

The gate drive circuit 30 includes a secondary side winding W23, two primary side windings W12 and W13, four resistors R2 to R5, and two diodes D2 and D3.

A first drive voltage PRDRV1 is input to one end of the secondary side winding W23 and a second drive voltage PRDRV2 is input to the other end of the secondary side winding W23. A resistor R2 and a diode D2 are connected in parallel between one end of a primary side winding W12 and the gate of the second switch Q2 and the other end of the primary side winding W12 is connected to one end of a resistor R3 and the node Nd. The resistor R2, the resistor R3, and an anode of the diode D2 are connected to the gate of the second switch Q2. A resistor R4 and a diode D3 are connected between one end of a primary side winding W13 and the gate of the first switch Q1 in parallel and the other end of the primary side winding W13 is connected to one end of a resistor R5 and the primary side ground. The resistor R4, the resistor R5, and an anode of the diode D3 are connected to the gate of the first switch Q1.

The first switch Q1 operates to switch according to the gate voltage VG1 and the second switch Q2 operates to switch according to the gate voltage VG2. Since the first switch Q1 and the second switch Q2 are N-channel transistors, an enabled level of each of the gate voltage VG1 and the gate voltage VG2 is a high level and a disabled level thereof is a low level.

When the first drive voltage PRDRV1 has a high level and the second drive voltage PRDRV2 has a low level, a current of the primary side winding W12 flows through the resistor R3 and the diode D2 and a current of the primary side winding W13 flows through the resistor R4 and the resistor R5. Thus, the gate voltage VG1 is formed as a high level voltage which may turn on the first switch Q1 so that the first switch Q1 is turned on, and the gate voltage VG2 becomes a voltage lower than a source voltage of the second switch Q2 so that the second switch Q2 is turned off.

When the second drive voltage PRDRV2 has a high level and the first drive voltage PRDRV1 has a low level, the current of the primary side winding W12 flows through the resistor R2 and the resistor R3 and the current of the primary side winding W13 flows through the resistor R5 and the diode D3. Thus, the gate voltage VG2 is formed as a high level voltage which may turn on the second switch Q2 so that the second switch Q2 is turned on, and the gate voltage VG1 becomes a voltage lower than a source voltage of the first switch Q1 so that the first switch Q1 is turned off.

When the input current Iin flows through the inductor Lr, the current is induced to a secondary side winding W24 and then a detection voltage VCS is generated. For example, when the input current Iin flows in a direction toward the node Nd due to resonance, a current of the secondary side winding W24 flows through the secondary side ground through a resistor R7 and a resistor R6. Thus, a positive detection voltage VCS corresponding to the input current Iin is generated. When the input current Iin flows in a direction of exiting out of the node Nd, the current of the secondary side winding W24 flows from the secondary side ground and to the resistor R6 and the resistor R7. Thus, a negative detection voltage VCS corresponding to the input current Iin is generated. The detection voltage VCS may be supplied to the switch control circuit 10 through a pin P8, and then the switch control circuit 10 may detect an overcurrent using the detection voltage VCS.

An end of a resistor R1 is connected to one end of the secondary side winding W24, the other end of the resistor R1 is connected to one end of a capacitor C1 and a pin P7, and the other end of the capacitor C1 is connected to the secondary side ground. A voltage corresponding to the current which flows through the secondary side winding W24 is integrated through an RC filter with the resistor R1 and the capacitor C1, in which an integration result is information corresponding to a current (hereinafter, a load current) which is supplied to a load. The integration result is a voltage for detecting the load and hereinafter is referred to as a current detection voltage VICS.

The switch control circuit 10 includes a pin P1 in which the first drive voltage PRDRV1 is output, a pin P2 in which the second drive voltage PRDRV2 is output, a pin P3 in which the first SR gate voltage SRG1 is output, a pin P4 in which the second SR gate voltage SRG2 is output, a pin P5 in which a first drain voltage SRD1 is input, a pin P6 in which a second drain voltage SRD2 is input, the pin P7 in which the current detection voltage VICS is input, the pin P8 in which the detection voltage VCS is input, and a pin P9 connected to a capacitor C2 for adjusting dead time.

The pin P5 is connected to the drain of the first synchronous rectification switch SR1 through a resistor R8 and the pin P6 is connected to the drain of the second synchronous rectification switch SR2 through a resistor R9.

The switch control circuit 10 may determine an operation region of the resonant converter 1 using at least one of the first and second drain voltages SRD1 and SRD2, and determine whether on-time of the first and second synchronous rectification switches SR1 and SR2 is compensated or not according to the determined operation region. An area in which an operating frequency of the resonant converter 1 is higher than a resonant frequency is referred to as an above region, and an area in which the operating frequency thereof is lower than the resonant frequency is referred to as a below region. The switch control circuit 10 compensates for the on-time of the first and second synchronous rectification switches SR1 and SR2 when the operation region of the resonant converter 1 is the above region (the area in which the operating frequency is higher than the resonant frequency).

The switch control circuit 10 is synchronized with turn-on of the first switch Q1 and turns on the first synchronous rectification switch SR1 and is synchronized with turn-on of the second switch Q2 and turns on the second synchronous rectification switch SR2. The switch control circuit 10 maintains the first and second synchronous rectification switches SR1 and SR2 during a predetermined on-time and then turns off the first and second synchronous rectification switches SR1 and SR2. In this case, the on-time is differently set according to the operation region of the resonant converter 1, that is, the on-time is differently set for each of the above region and the below region.

For example, for the below region, on-time of a current cycle may be determined by subtracting a predetermined margin from a conduction duration of each of the first and second synchronous rectification switches SR1 and SR2 in an immediately preceding switching cycle. The conduction duration of each of the first and second synchronous rectification switches SR1 and SR2 in the immediately preceding switching cycle refers to duration from time in which each of the body diodes BD3 and BD4 connected to each of the first and second synchronous rectification switches SR1 and SR2 is conducted, up to time in which each of the body diodes BD3 and BD4 connected to each of the first and second synchronous rectification switches SR1 and SR2 is blocked. The on-time refers to an on duration of each of the first and second synchronous rectification switches SR1 and SR2. Since the conduction duration of each of the first and second synchronous rectification switches SR1 and SR2 is smaller than the on-time of the primary side switches in the below region, the predetermined margin is appropriately set in accordance with the design. For example, the predetermined margin may be dead time of the first and second synchronous rectification switches SR1 and SR2.

However, in the above region, even after the primary side switches are turned off, each of the body diodes BD3 and BD4 may be maintained in a conductive state. According to an embodiment, in order to prevent the first and second synchronous rectification current ISR1 and ISR2 from flowing through the body diodes BD3 and BD4, even after the primary side switches are turned off, the first and second synchronous rectification switches SR1 and SR2 are maintained in an on state.

For example, in the above region, each of the first and second synchronous rectification switches SR1 and SR2 is turned off at a time which extends from off time of each of the first switch Q1 and the second switch Q2 by predetermined duration.

Specifically, the switch control circuit 10 turns off the first synchronous rectification switch SR1 after predetermined first extended duration from turn-off time of the first switch Q1 and turns off the second synchronous rectification switch SR2 after predetermined second extended duration from turn-off time of the second switch Q2.

When the resonant converter 1 operates in the above region, on duration of the first and second synchronous rectification switches SR1 and SR2 is compensated by the first and second extended duration, and various methods may be implemented for setting the first and second extended duration. In order to minimize a conventional problem caused in the above region, that is, in order to minimize duration in which each of the body diodes BD3 and BD4 is maintained in a conductive state even after the primary side switches are turned off, the on duration of the first and second synchronous rectification switches SR1 and SR2 may be compensated.

For example, the switch control circuit 10 counts duration from turn-on time of each of the first switch Q1 and the second switch Q2 to conduction end time of the first and second synchronous rectification switches SR1 and SR2. The switch control circuit 10 may calculate the first and second extended duration by subtracting two durations explained below from the counted duration. First, first duration of two durations is duration in which dead time between the first and second switches Q1 and Q2 is subtracted from maximum on-time of each of the first and second switches Q1 and Q2, and the other duration is the dead time between the first and second synchronous rectification switches SR1 and SR2. The maximum on-time of each of the first and second switches Q1 and Q2 may be on-time when a duty cycle is 50%.

For example, the switch control circuit 10 may calculate the first duration of each of the first and second switches Q1 and Q2 by subtracting the dead time duration of the first and second switches Q1 and Q2 from enabled duration of a clock signal CLK which determines the switching frequency of the primary side switches.

The switch control circuit 10 applies the calculated first and second extended durations to a next switching cycle of each of the first and second synchronous rectification switches SR1 and SR2. Thus, the switch control circuit 10 may set the on-time of each of the first and second synchronous rectification switches SR1 and SR2 based on a duration spanning from conduction time of each of the first and second synchronous rectification switches SR1 and SR2 up to time as delayed by one of the first and second extended duration calculated in the immediately preceding switching cycle at the turn-off time of each of the first and second switches Q1 and Q2. This will be described below in detail.

In calculating the first duration, disabled duration instead of the enabled duration of the clock signal CLK may be used. The clock signal CLK may be generated to have a duty cycle of 50%. Duration from time in which the dead time between the primary side switches Q1 and Q2 is delayed to enabled end time of the clock signal CLK (e.g., falling edge) may be the first duration of the first switch Q1 at enabled time of the clock signal CLK (e.g., rising edge). Duration from time in which the dead time between the primary side switches Q1 and Q2 is delayed to disabled end time of the clock signal CLK (e.g., rising edge) may be the first duration of the second switch Q2 at disabled time of the clock signal CLK (e.g., falling edge).

However, the above is provided as an example only and the switch control circuit 10 in accordance with the embodiment of the invention is not limited thereto. The switch control circuit 10 may separately generate a clock signal for controlling a switching operation of the first switch Q1 and a clock signal for controlling a switching operation of the second switch Q2, and count enabled duration of each clock signal. In this case, the two clock signals may have a phase difference of 180 degrees from each other. Hereinafter, an embodiment will be explained based on an example that the switch control circuit 10 generates one clock signal CLK in order to control the switching operation of the primary side switches Q1 and Q2.

Alternatively, the switch control circuit 10 may count duration from off time of each of the first switch Q1 and the second switch Q2 to end time of the conduction duration of each of the first and second synchronous rectification switches SR1 and SR2, and may calculate the first and second extended durations of the respective first and second synchronous rectification switches SR1 and SR2 based on the duration in which the dead time between the first and second synchronous rectification switches SR1 and SR2 is subtracted from the counted duration.

The switch control circuit 10 applies the calculated first and second extended durations to a next switching cycle of each of the first and second synchronous rectification switches SR1 and SR2.

As described above, the conduction duration of each of the first and second synchronous rectification switches SR1 and SR2 in the below region is smaller than the on-time of each of the first switch Q1 and the second switch Q2. Therefore, since a current does not flow through each of the first and second synchronous rectification switches SR1 and SR2 in non-conduction duration of each of the first and second synchronous rectification switches SR1 and SR2, it is not necessary to compensate for the on-time. However, in the above region, the conduction duration of each of the first and second synchronous rectification switches SR1 and SR2 may be greater than the on-time of each of the first switch Q1 and the second switch Q2. Therefore, the on-time of each of the first and second synchronous rectification switches SR1 and SR2 is compensated. Thus, the current which flows through each of the first and second synchronous rectification switches SR1 and SR2 flows between the drain and source of each switch instead of the body diodes BD3 and BD4, and thus conduction loss may be minimized.

Hereinafter, an embodiment of the switch control circuit 10 will be described with reference to FIG. 2.

Figure 2:
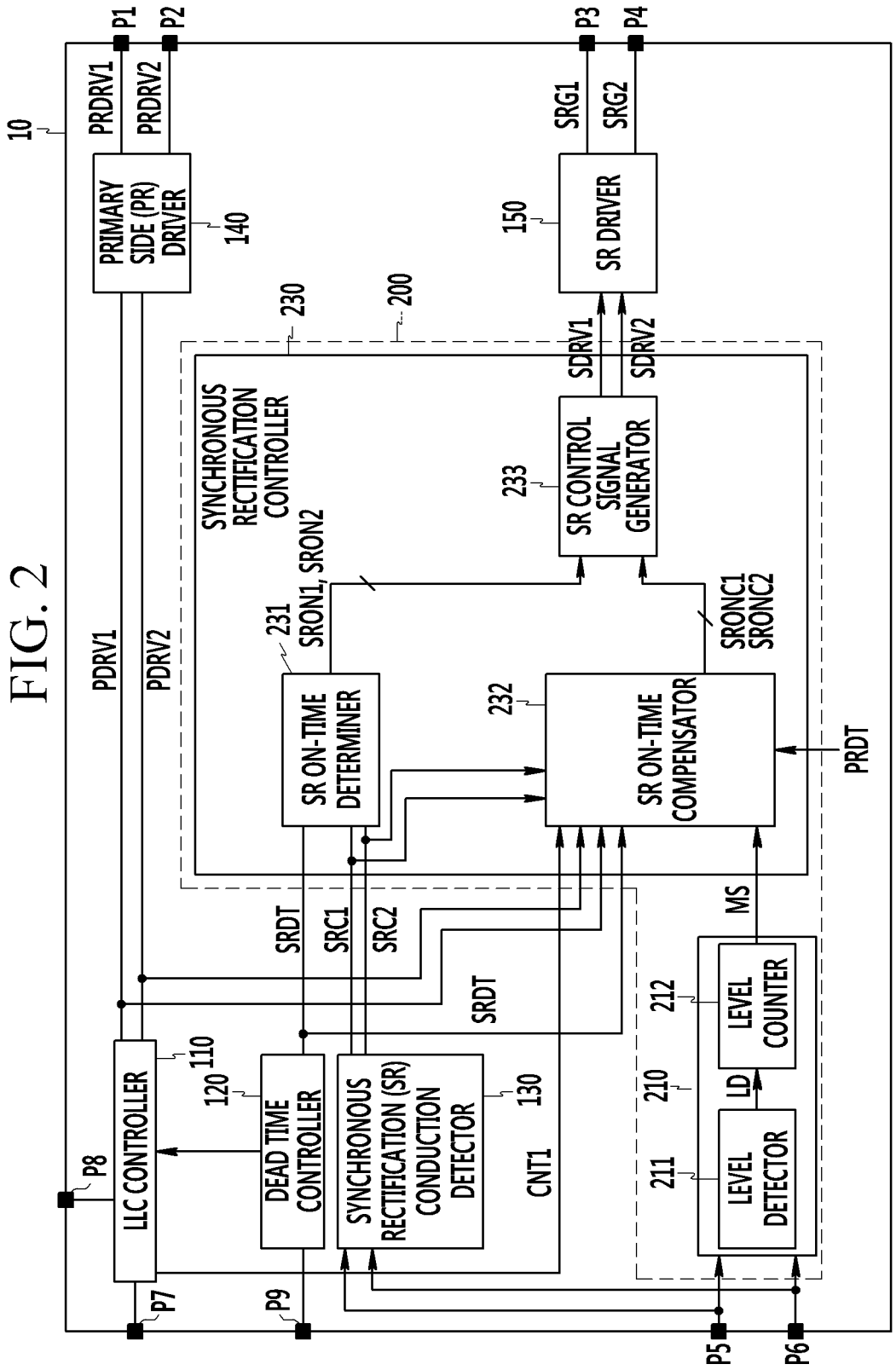
FIG. 2 is a circuit diagram of a switch control circuit according to an embodiment of the invention.

FIG. 2 is a circuit diagram showing a switch control circuit according to the embodiment of the invention.

As shown in FIG. 2, the switch control circuit 10 includes a configuration for controlling primary side switches and a configuration for controlling secondary side synchronous rectification switches.

For example, the switch control circuit 10 includes an LLC controller 110, a dead time controller 120, an SR conduction detector 130, a primary side driver (hereinafter, a PR driver) 140, a synchronous rectification driver (hereinafter, an SR driver) 150, and a synchronous rectification switch controller 200.

The synchronous rectification switch controller 200 includes a mode selector 210 and a synchronous rectification controller 230. The mode selector 210 includes a level detector 211 and a level counter 212. The synchronous rectification controller 230 includes an SR on-time determiner 231, an SR on-time compensator 232, and an SR control signal generator 233.

The LLC controller 110 generates a clock signal CLK which determines the switching frequency of the first switch Q1 and the second switch Q2 according to the current detection voltage VICS. For example, in order to increase the switching frequency according to reduction of the current detection voltage VICS, a frequency of the clock signal CLK is increased. On the other hand, in order to reduce the switching frequency according to increase of the current detection voltage VICS, the frequency of the clock signal CLK is reduced.

The LLC controller 110 generates a count signal CNT1 according to a result of counting enabled duration of the clock signal CLK. The count signal CNT1 is transferred to the synchronous rectification switch controller 200. For example, the count signal CNT1 may be transferred to the SR on-time compensator 232.

Further, the LLC controller 110 may receive a detection voltage VCS, determine an input current Iin as an overcurrent when the detection voltage VCS is out of a predetermined threshold range, and then disable a switching operation of the primary side switches Q1 and Q2.

The LLC controller 110 generates a first drive control signal PDRV1 and a second drive control signal PDRV2 based on the clock signal CLK and first dead time information PRDT. For example, the LLC controller 110 increases the first drive control signal PDRV1 to a high level at a time that is delayed from a rising edge of the clock signal CLK by the first dead time in accordance with the first dead time information PRDT, and decreases the second drive control signal PDRV2 to a low level at the rising edge of the clock signal CLK. The LLC controller 110 increases the second drive control signal PDRV2 to a high level at a time that is delayed from a falling edge of the clock signal CLK by the first dead time in accordance with the first dead time information PRDT, and decreases the first drive control signal PDRV1 to a low level at the falling edge of the clock signal CLK.

The PR driver 140 generates first and second drive voltages PRDRV1 and PRDRV2 according to the first and second drive control signals PDRV1 and PDRV2. The PR driver 140 has a phase synchronized with the first and second drive control signals PDRV1 and PDRV2 and generates the first and second drive voltages PRDRV1 and PRDRV2 having an appropriate level. The appropriate level refers to a sufficient level needed to switch the first and second switches Q1 and Q2.

The first and second drive control signals PDRV1 and PDRV2 are transferred to the synchronous rectification switch controller 200. For example, the first and second drive control signals PDRV1 and PDRV2 may be transferred to the SR on-time compensator 232.

The dead time controller 120 generates first dead time information PRDT and synchronous rectification dead time information SRDT using a voltage which is input through the pin P9. The first dead time information PRDT is transferred to the LLC controller 110, and the synchronous rectification dead time information SRDT is transferred to the synchronous rectification switch controller 200. For example, the synchronous rectification dead time information SRDT may be transferred to the SR on-time determiner 231.

The SR conduction detector 130 detects conduction duration of the first synchronous rectification switch SR1 using the first drain voltage SRD1, detects conduction duration of the second synchronous rectification switch SR2 using the second drain voltage SRD2, and then generates a first conduction detection signal SRC1 and a second conduction detection signal SRC2.

For example, the SR conduction detector 130 may detect duration from decreasing time of the first drain voltage SRD1 to increasing time as the conduction duration of the first synchronous rectification switch SR1, and then generate the first conduction detection signal SRC1 that has a high level during this duration. The SR conduction detector 130 may detect duration from decreasing time of the second drain voltage SRD2 to increasing time as the conduction duration of the second synchronous rectification switch SR2, and generate the second conduction detection signal SRC2 having a high level during this duration.

The first and second conduction detection signals SRC1 and SRC2 are transferred to the synchronous rectification switch controller 200. For example, the first and second conduction detection signals SRC1 and SRC2 may be transferred to the SR on-time determiner 231 and the SR on-time compensator 232.

The mode selector 210 detects at least one waveform of the first and second drain voltages SRD1 and SRD2 and determines the operation region of the resonant converter 1 according to the detected waveform. The mode selector 210 determines whether to compensate for SR on-time or not according to the operation region of the resonant converter 1, and selects a mode in accordance with the determination. For example, the mode selector 210 selects a first mode when the SR on-time compensation is needed, and on the other hand, selects a second mode. In the case of the first mode, the SR on-time compensator 232 may be enabled and the first and second extended duration for the on-time compensation may be set. In the case of the second mode, the SR on-time compensator 232 may be disabled.

The mode selector 210 includes the level detector 211 and the level counter 212.

The level detector 211 detects a level of at least one waveform of the first and second drain voltages SRD1 and SRD2 and then outputs a result of comparing the level with a predetermined threshold voltage. The predetermined threshold voltage may be set to an appropriate level for detecting ringing of a drain voltage. The ringing is a transient phenomenon and refers to a phenomenon in which the waveform of the corresponding signal is excessively vibrated.

The level counter 212 counts a change in an output LD of the level detector 211 and then select the mode according to the counted result. The level counter 212 determines that the ringing of the drain voltage has occurred when the counted result is equal to or greater than a predetermined value and thus selects the second mode, and determines that the ringing of the drain voltage has not occurred when the counted result is smaller than the predetermined value and thus selects the first mode.

For example, when at least one of the first and second drain voltages SRD1 and SRD2 is bounced based on the threshold voltage, the output LD of the level detector 211 is also bounced. Specifically, when at least one of the first and second drain voltages SRD1 and SRD2 is greater than the threshold voltage, the output LD of the level detector 211 may be a high level, and when at least one of the first and second drain voltages SRD1 and SRD2 is smaller than the threshold voltage, the output LD of the level detector 211 may be a low level.

The level counter 212 counts the number of times that the output LD of the level detector 211 is changed from a high level to a low level, or changed from a low level to a high level, and determines that it is a below region and selects the second mode when the result is equal to or greater than a predetermined value. On the other hand, the level counter 212 determines that it is an above region and selects the first mode when the number of times that the output LD of the level detector 211 is changed is smaller than the predetermined value.

The level counter 212 generates a mode signal MS according to the selected mode and transfers the mode signal MS to the SR on-time compensator 232.

The level counter 212 and an operation of the level counter 212 will be described with reference to FIGS. 3 and 4.

Figure 3:
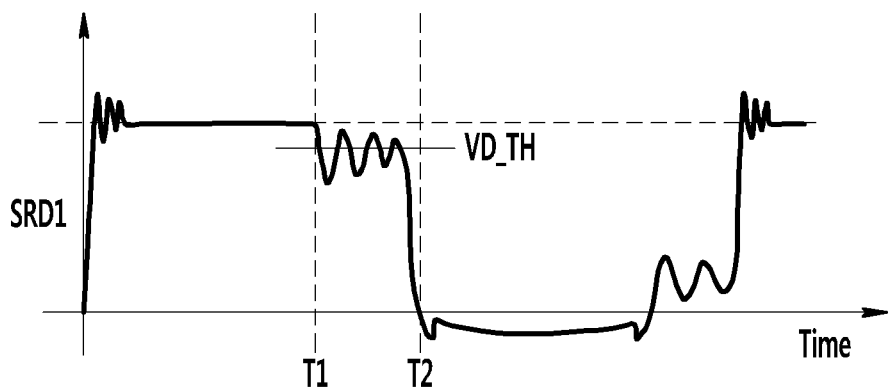
FIG. 3 is a waveform diagram showing a waveform of a first drain voltage in a below region.

FIG. 3 is a waveform diagram showing a waveform of a first drain voltage in a below region.

As shown in FIG. 3, the first drain voltage SRD1 in the below region is bounced based on a threshold voltage VD_TH for a duration spanning from turn-off time T1 of the second synchronous rectification switch SR2 to conduction start time T2 of the first synchronous rectification switch SR1. Thus, the output LD of the level detector 211 is bounced, with repeating between the high level and the low level.

As shown in FIG. 3, since the output LD is changed seven times based on the threshold voltage VD_TH, the counted result of the level counter 212 is equal to, or greater than a predetermined value (e.g., three counts greater). Thus, the level counter 212 determines the operation region of the resonant converter 1 to be the below region and then generates the mode signal MS which indicates the second mode.

Figure 4:
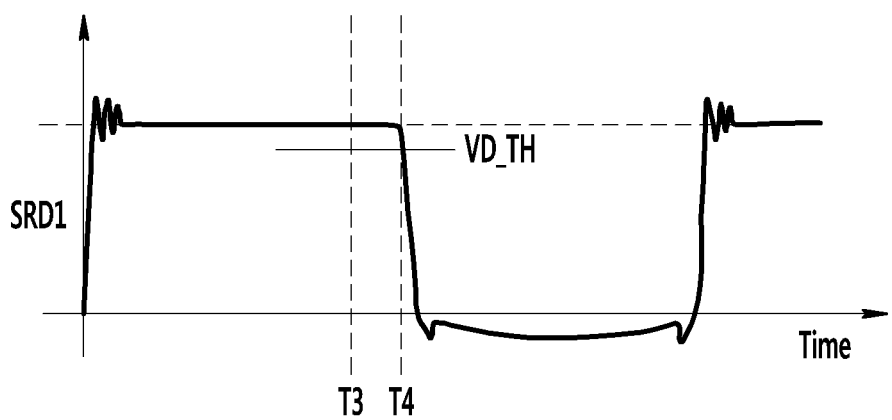
FIG. 4 is a waveform diagram showing a waveform of a first drain voltage in an above region.

FIG. 4 is a waveform diagram showing a waveform of a first drain voltage in an above region.

As shown in FIG. 4, the first drain voltage SRD1 in the above region is maintained to have a voltage higher than the threshold voltage VD_TH for a duration spanning from turn-off time T3 of the second synchronous rectification switch SR2 to conduction start time T4 of the first synchronous rectification switch SR1. The first drain voltage SRD1 is sharply reduced at the time T4. Thus, the output LD of the level detector 211 is reduced from a high level to a low level, but not bounced.

As shown in FIG. 4, since the output LD is changed once based on the threshold voltage VD_TH, the counted result of the level counter 212 is less than the predetermined value (e.g., three counts lower). Thus, the level counter 212 determines the operation region of the resonant converter 1 to be the above region and generates the mode signal MS which indicates the first mode.

The SR on-time compensator 232 is disabled or enabled according to the mode signal MS to calculate the first and second extended durations. The SR on-time compensator 232 may receive the first and second drive control signals PDRV1 and PDRV2, the synchronous rectification dead time information SRDT, the first dead time information PRDT, the first and second conduction detection signals SRC1 and SRC2, and the count signal CNT1 in order to calculate the first and second extended durations.

The SR on-time compensator 232 counts duration spanning from enabled time of each of the first and second drive control signals PDRV1 and PDRV2 to conduction end time of the first and second synchronous rectification switches SR1 and SR2 based on each of the first and second conduction detection signals SRC1 and SRC2. For example, the SR on-time compensator 232 counts, as a first counting, a duration spanning from a rising edge of the first drive control signal PDRV1 to a falling edge of the first conduction detection signal SRC1, and counts, as a second counting, a duration spanning from a rising edge of the second drive control signal PDRV2 to a falling edge of the second conduction detection signal SRC2. A first count signal as a first counted result and a second count signal as a secondly counted result may be generated according to the counted results generated by the SR on-time compensator 232.

The SR on-time compensator 232 calculates the first and second extended durations based on the first count signal, the second count signal, the count signal CNT1, the first dead time information PRDT, and the synchronous rectification dead time information SRDT. Each of the first count signal, the second count signal, the count signal CNT1, the first dead time information PRDT, and the synchronous rectification dead time information SRDT may be a digital signal of the predetermined number of bits that indicates corresponding duration.

For example, the SR on-time compensator 232 subtracts the first dead time information PRDT from the count signal CNT1 in an immediately preceding switching cycle and calculates the first extended duration (i.e., extended duration corresponding to SR1) according to a subtracting result (CNT1−PRDT) and the synchronous rectification dead time information SRDT from the first count signal in the immediately preceding switching cycle. The SR on-time compensator 232 may extend enabled duration of the first drive control signal PDRV1 in a current cycle by the first extended duration to generate a first on-time compensation signal SRONC1.

The SR on-time compensator 232 subtracts the first dead time information PRDT from the count signal CNT1 in the immediately preceding switching cycle and calculates the second extended duration (i.e., extended duration corresponding to SR2) according to a subtracting result (CNT1−PRDT) and the synchronous rectification dead time information SRDT from the second count signal in the immediately preceding switching cycle. The SR on-time compensator 232 may extend enabled duration of the second drive control signal PDRV2 in a current cycle by the second extended duration to generate a second on-time compensation signal SRONC2.

The method of calculating the first and second extended durations of the SR on-time compensator 232 is not limited to specific example only. As described above, the SR on-time compensator 232 may count duration spanning from disabled time of each of the first and second drive control signals PDRV1 and PDRV2 in the immediately preceding switching cycle to falling edge time of each of the first and second conduction detection signals SRC1 and SRC2, and calculate the first and second extended duration by subtracting the synchronous rectification dead time from the counted duration.

For example, the SR on-time compensator 232 counts, as a third counting, a duration spanning from a falling edge of the first drive control signal PDRV1 in the immediately preceding switching cycle to a falling edge of the first conduction detection signal SRC1 in the immediately preceding switching cycle, and counts, as a fourth counting, a duration from a falling edge of the second drive control signal PDRV2 in the immediately preceding switching cycle to a falling edge of the second conduction detection signal SRC2 in the immediately preceding switching cycle. A third count signal as a thirdly counted result and a fourth count signal as a fourthly counted result may be generated according to the counted results generated by the SR on-time compensator 232.

The SR on-time compensator 232 may calculate the first and second extended durations by subtracting the synchronous rectification dead time information SRDT from each of the third count signal and the fourth count signal. The SR on-time compensator 232 may extend enabled duration of each of the first and second drive control signals PDRV1 and PDRV2 in the current cycle by the first and second extended durations to thus generate the first and second on-time compensation signals SRONC1 and SRONC2.

When the mode signal MS indicates the second mode, the SR on-time compensator 232 is disabled and may generate the first and second on-time compensation signals SRONC1 and SRONC2 of a predetermined level. The predetermined level may be appropriately set according to a logic operation condition of the SR control signal generator 233.

The SR on-time determiner 231 determines on-time of each of the first and second synchronous rectification switches SR1 and SR2 using the first and second conduction detection signals SRC1 and SRC2 and the synchronous rectification dead time information SRDT.

For example, the SR on-time determiner 231 counts high level duration (the conduction duration of the first synchronous rectification switch SR1) of the first conduction detection signal SRC1 in the immediately preceding switching cycle, sets duration in which the dead time according to the synchronous rectification dead time information SRDT is subtracted from the counted duration as on-time, and then generates a first on-time signal SRON1 to control the first synchronous rectification switch SR1 in the current cycle according to the set on-time.

The SR on-time determiner 231 counts high level duration (the conduction duration of the second synchronous rectification switch SR2) of the second conduction detection signal SRC2 in the immediately preceding switching cycle, sets duration in which the dead time of the synchronous rectification dead time information SRDT is subtracted from the counted duration as on-time, and then generates a second on-time signal SRON2 to control the second synchronous rectification switch SR2 in the current cycle according to the set on-time.

The SR on-time determiner 231 transfers the first and second on-time signals SRON1 and SRON2 to the SR control signal generator 233.

The SR control signal generator 233 generates first and second SR drive control signals SDRV1 and SDRV2 based on the first and second on-time signals SRON1 and SRON2 and the first and second on-time compensation signals SRONC1 and SRONC2.

The SR control signal generator 233 generates a first SR drive control signal SDRV1 based on the first on-time signal SRON1 and the first on-time compensation signal SRONC1, and generates a second SR drive control signal SDRV2 based on the second on-time signal SRON2 and the second on-time compensation signal SRONC2.

For example, in the first mode, the SR control signal generator 233 enables the first SR drive control signal SDRV1 in synchronization with the first on-time signal SRON1 and disables the first SR drive control signal SDRV1 in synchronization with the first on-time compensation signal SRONC1. In the first mode, the SR control signal generator 233 enables the second SR drive control signal SDRV2 in synchronization with the second on-time signal SRON2 and disables the second SR drive control signal SDRV2 in synchronization with the second on-time compensation signal SRONC2.

In the second mode, the SR control signal generator 233 generates the first SR drive control signal SDRV1 according to the first on-time signal SRON1 and generates the second SR drive control signal SDRV2 according to the second on-time signal SRON2.

Thus, when the first mode is selected, the SR control signal generator 233, in synchronization with conduction time of each of the first and second synchronous rectification switches SR1 and SR2, turns on each of the first and second synchronous rectification switches SR1 and SR2, and generates the first and second SR drive control signals SDRV1 and SDRV2 which turn off the first and second synchronous rectification switches SR1 and SR2, respectively, at time extended by one of the first extended duration and the second extended duration from the turn off time of each of the first and second switches Q1 and Q2.

When the second mode is selected, the SR control signal generator 233, in synchronization with conduction time of each of the first and second synchronous rectification switches SR1 and SR2 turns on each of the first and second synchronous rectification switches SR1 and SR2, and generates the first and second SR drive control signals SDRV1 and SDRV2 which turn off the first and second synchronous rectification switches SR1 and SR2, respectively, at a time of elapsing the on-time corresponding to each of the first and second on-time signals SRON1 and SRON2.

The SR driver 150 generates the first and second SR gate voltages SRG1 and SRG2 according to the first and second SR drive control signals SDRV1 and SDRV2. The SR driver 150 has a phase synchronized with the first and second SR drive control signals SDRV1 and SDRV2 and generates the first and second SR gate voltages SRG1 and SRG2 of appropriate level. The appropriate level refers to a sufficient level needed to switch the first and second synchronous rectification switches SR1 and SR2.

Hereinafter, an on-time control operation according to the operation region of the resonant converter will be described with reference to FIGS. 5 and 6 in detail.

Figure 5:
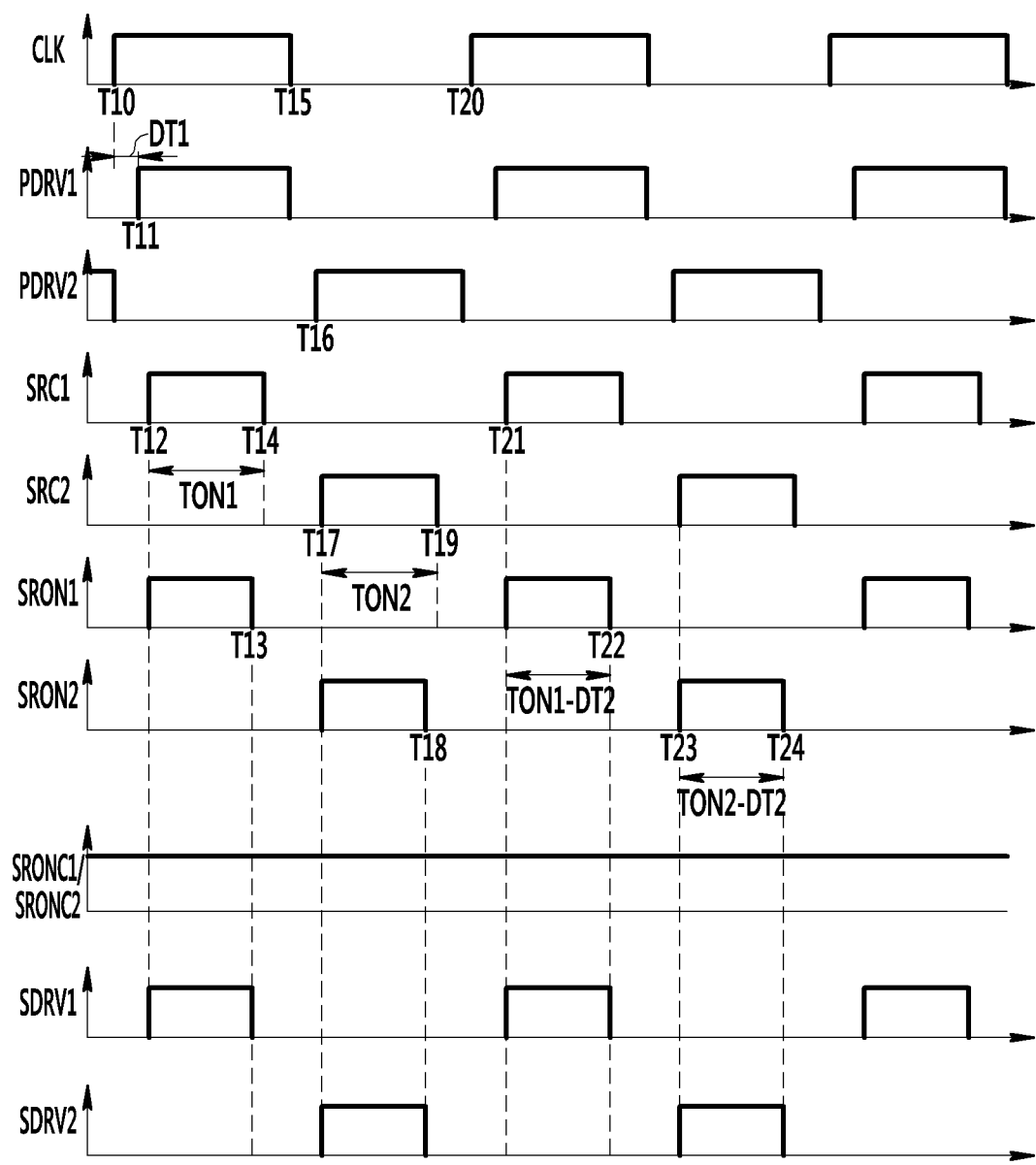
FIG. 5 is a waveform diagram showing waveforms of a clock signal, first and second drive control signals, first and second conduction detection signals, first and second on-time signals, first and second on-time compensation signals, and first and second SR drive control signals in a below region.

FIG. 5 is a waveform diagram showing waveforms of a clock signal, first and second drive control signals, first and second conduction detection signals, first and second on-time signals, first and second on-time compensation signals, and first and second SR drive control signals in a below region.

As shown in FIG. 5, the second drive control signal (PDRV2) in synchronization with a rising edge of the clock signal CLK at time T10 is decreased, and the first drive control signal PDRV1 is increased at time T11 which is delayed from the time T10 by first dead time DT1 according to the first dead time information PRDT. Thus, the second switch Q2 is turned off at time T10, the first switch Q1 is turned on at time T11, the first drain voltage SRD1 is sharply reduced as the body diode BD3 is conducted, and the first conduction detection signal SRC1 is increased at time T12 to a high level.

The first on-time signal SRON1 is increased at time T12, and decreased to a low level at time T13 of elapsing the on-time (i.e., 'the conduction duration of the first synchronous rectification switch SR1 in an immediately preceding switching cycle' subtracted by 'second dead time DT2 according to the synchronous rectification dead time information SRDT') which is set according to the conduction duration of the first synchronous rectification switch SR1 in the immediately preceding switching cycle from the time T12.

In the second mode (i.e., below region), the first and second on-time compensation signals SRONC1 and SRONC2 are each set to a high level. However, it is only an example, and in the second mode (i.e., below region), the first and second on-time compensation signals SRONC1 and SRONC2 may be each set to a low level or may not occur.

The SR control signal generator 233 generates the first SR drive control signal SDRV1 having an enabled level (i.e., high level) for duration T12-T13 according to the first on-time signal SRON1. The first synchronous rectification switch SR1 is turned on at time T12 and turned off at time T13. Duration T12-T14 is counted by the SR on-time determiner 231 in order to calculate on-time in a next switching cycle. Duration as a result of subtracting the second dead time DT2 from duration TON1 is calculated as the on-time in the next switching cycle.

The first drive control signal PDRV1 in synchronization with a falling edge of the clock signal CLK at time T15 is decreased, and the second drive control signal PDRV2 is increased at time T16 which is delayed from the time T15 by the first dead time DT1. Thus, the first switch Q1 is turned off at time T15, the second switch Q2 is turned on at time T16, the second drain voltage SRD2 is sharply reduced as the body diode BD4 is conducted, and the second conduction detection signal SRC2 is increased at time T17 to a high level.

The second on-time signal SRON2 is increased at time T17, and decreased to a low level at time T18 of elapsing the on-time (i.e., 'the conduction duration of the second synchronous rectification switch SR2 in the immediately preceding switching cycle' subtracted by 'the second dead time DT2') which is set according to the conduction duration of the second synchronous rectification switch SR2 in the immediately preceding switching cycle from the time T17.

The SR control signal generator 233 generates the second SR drive control signal SDRV2 having an enabled level (i.e., high level) for duration T17-T18 according to the second on-time signal SRON2. The second synchronous rectification switch SR2 is turned on at time T17 and the second synchronous rectification switch SR2 is turned off at time T18. Duration T17-T19 is counted by the SR on-time determiner 231 in order to calculate on-time in a next switching cycle. Duration as a result of subtracting the second dead time DT2 from duration TON2 is calculated as the on-time in the next switching cycle.

When the clock signal CLK is increased at time T20, operations of duration T10-T19 are repeated. On-time TON1-DT2 is set as the on-time of the first synchronous rectification switch SR1 in a cycle after the time T20. Therefore, the first conduction detection signal SRC1 is increased at time T21 to a high level, the first on-time signal SRON1 and the first SR drive control signal SDRV1 are increased to a high level, thus turning on the first synchronous rectification switch SR1, and the first on-time signal SRON1 and the first SR drive control signal SDRV1 are decreased to a low level at time T22 of elapsing time T21 by the on-time TON1-DT2, thus turning off the first synchronous rectification switch SR1.

On-time TON2-DT2 is set to the on-time of the second synchronous rectification switch SR2 in a cycle after time T20. Therefore, the second conduction detection signal SRC2 is increased at time T23 to a high level, the second synchronous rectification switch SR2 is turned on as the second on-time signal SRON2 and the second SR drive control signal SDRV2 are increased to a high level, and the second synchronous rectification switch SR2 is turned off as the second on-time signal SRON2 and the second SR drive control signal SDRV2 are decreased to a low level at time T24 of elapsing the time T23 by the on-time TON2-DT2.

Figure 6:
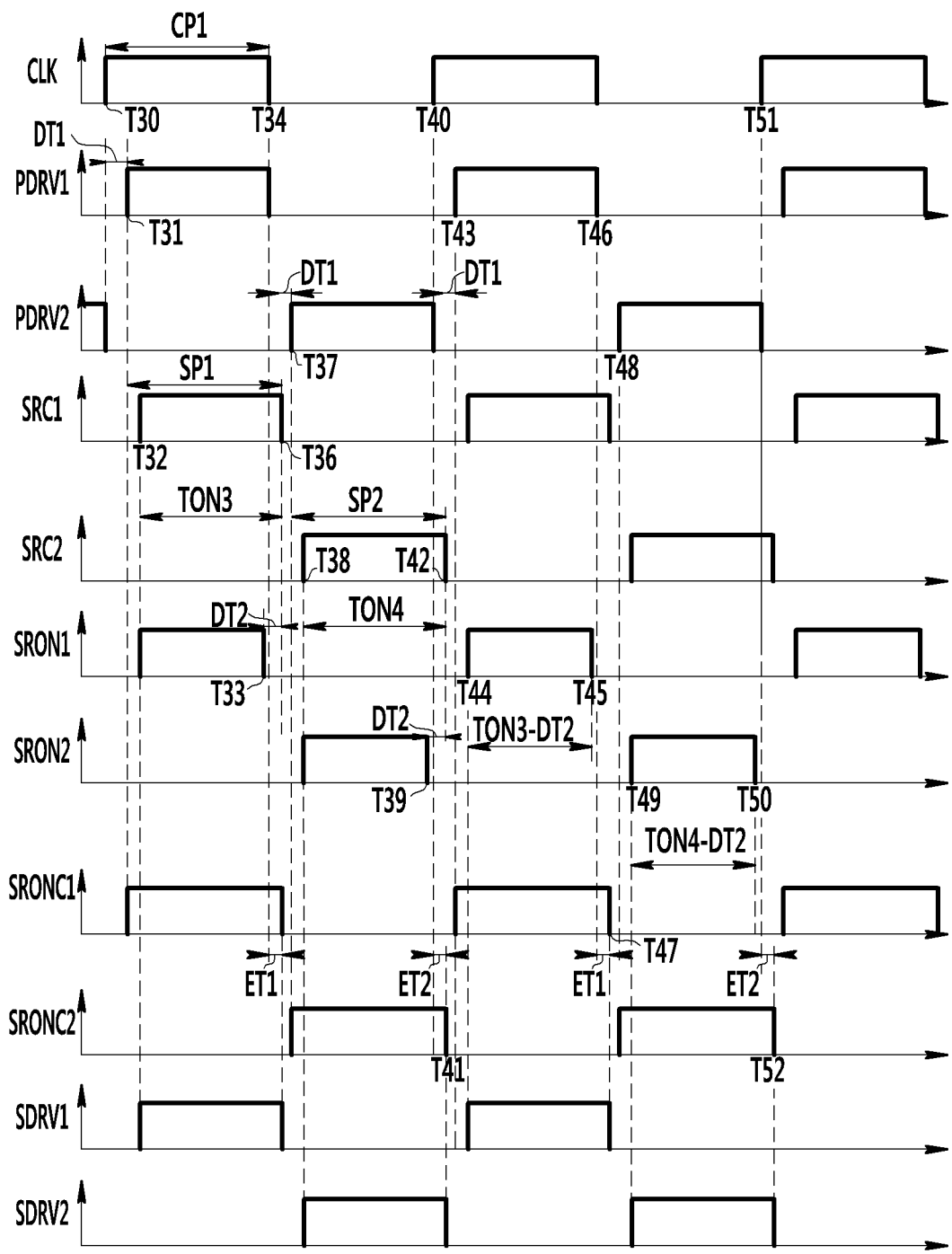
FIG. 6 is a waveform diagram showing waveforms of a clock signal, first and second drive control signals, first and second conduction detection signals, first and second on-time signals, first and second on-time compensation signals, and first and second SR drive control signals in an above region.

FIG. 6 is a waveform diagram showing waveforms of a clock signal, first and second drive control signals, first and second conduction detection signals, first and second on-time signals, first and second on-time compensation signals, and first and second SR drive control signals in an above region.

As shown in FIG. 6, the second drive control signal PDRV2 in synchronization with a rising edge of the clock signal CLK at time T30 is decreased, and the first drive control signal PDRV1 is increased at time T31 which is a time delayed from the time T30 by first dead time DT1. Thus, the second switch Q2 is turned off at time T30, the first switch Q1 is turned on at time T31, the first drain voltage SRD1 is sharply reduced as the body diode BD3 is conducted, and the first conduction detection signal SRC1 is increased at time T32 to a high level. The first on-time compensation signal SRONC1 in synchronization with the first drive control signal PDRV1 at time T31 is increased to a high level.

The first on-time signal SRON1 is increased at time T32, and decreased to a low level at time T33 of elapsing the on-time (i.e., 'the conduction duration of the first synchronous rectification switch SR1 in an immediately preceding switching cycle' subtracted by 'the second dead time DT2') which is set according to the conduction duration of the first synchronous rectification switch SR1 in the immediately preceding switching cycle from the time T32.

The first drive control signal PDRV1 in synchronization with a falling edge of the clock signal CLK at time T34 is decreased. The SR on-time compensator 232 calculates the first extended duration ET1 by subtracting a subtracting result (CNT1−PRDT) of subtracting the count signal CNT1 in the immediately preceding switching cycle and the first dead time information PRDT and the synchronous rectification dead time information SRDT from a result of counting duration spanning from a rising edge of the first drive control signal PDRV1 in the immediately preceding switching cycle before time T30 to a falling edge of the first conduction detection signal SRC1 in the immediately preceding switching cycle. The SR on-time compensator 232 decreases the first on-time compensation signal SRONC1 at time T35 which extends from the time T34 by the first extended duration ET1.

The SR control signal generator 233 generates the first SR drive control signal SDRV1 to an enabled level (a high level) for duration T32-T35 from time T32 which is a rising edge of the first on-time signal SRON1 to time T35 which is a falling edge of the first on-time compensation signal SRONC1 in the first mode. The first synchronous rectification switch SR1 is turned on at time T32 and the first synchronous rectification switch SR1 is turned off at time T35. Duration T32-T36 is counted by the SR on-time determiner 231 in order to calculate on-time in a next switching cycle. Duration as a result of subtracting the second dead time DT2 from duration TON3 is calculated as the on-time in the next switching cycle.

As described above, in the first mode, as the on-time extends by the first extended duration, conduction loss due to the body diode BD3 may be minimized.

The first drive control signal PDRV1 in synchronization with a falling edge of the clock signal CLK at time T34 is decreased and the second drive control signal PDRV2 is increased at time T37 which is delayed from the time T34 by the first dead time DT1. Thus, the first switch Q1 is turned off at the time T34, the second switch Q2 is turned on at time T37, the second drain voltage SRD2 is sharply reduced as the body diode BD4 is conducted, and the second conduction detection signal SRC2 is increased at time T38 to a high level. The second on-time compensation signal SRONC2 is synchronized with the second drive control signal PDRV2 and increased at time T37 to a high level.

The second on-time signal SRON2 is increased at time T38, and decreased to a low level at time T39 of elapsing the on-time (i.e., 'the conduction duration of the second synchronous rectification switch SR2 in the immediately preceding switching cycle' subtracted by 'the second dead time DT2') which is set according to the conduction duration of the second synchronous rectification switch SR2 in the immediately preceding switching cycle from the time T38.

The second drive control signal PDRV2 in synchronization with a rising edge of the clock signal CLK at time T40 is decreased. The SR on-time compensator 232 calculates second extended duration ET2 by subtracting a subtraction result (CNT1−PRDT) of the count signal CNT1 in the immediately preceding switching cycle and the first dead time information PRDT and the synchronous rectification dead time information SRDT from a duration counted from a rising edge of the second drive control signal PDRV2 in the immediately preceding switching cycle before time T40 to a falling edge of the second conduction detection signal SRC2 in the immediately preceding switching cycle. The SR on-time compensator 232 decreases the second on-time compensation signal SRONC2 at time T41 which extends from time T40 by the second extended duration ET2.

The SR control signal generator 233 generates the second SR drive control signal SDRV2 to an enabled level (i.e., high level) for duration T38-T41 from time T38 which is a rising edge of the second on-time signal SRON2 to time T41 which is a falling edge of the second on-time compensation signal SRONC2 in the first mode. The second synchronous rectification switch SR2 is turned on at time T38 and the second synchronous rectification switch SR2 is turned off at time T41. Duration T38-T42 is counted by the SR on-time determiner 231 in order to calculate on-time in a next switching cycle. Duration as a result of subtracting the second dead time DT2 from duration TON4 is calculated as the on-time in the next switching cycle.

As described above, in the first mode, as the on-time extends by the second extended duration, conduction loss due to the body diode BD4 may be minimized.

When the clock signal CLK is increased at the time T40, operations of duration T30-T42 are repeated. Duplicated descriptions will be omitted.

On-time TON3-DT2 is set to the on-time of the first synchronous rectification switch SR1 in a cycle after time T40. After the first switch Q1 is turned on at time T43, the first conduction detection signal SRC1 is increased to a high level at time T44 as the first synchronous rectification switch SR1 is conducted, and the first synchronous rectification switch SR1 is turned on as the first on-time signal SRON1 and the first SR drive control signal SDRV1 are increased to a high level. The first on-time signal SRON1 is decreased to a low level at time T45 at the elapsing time T44 by the on-time TON3-DT2.

The first drive control signal PDRV1 is increased at time T43, and the SR on-time compensator 232 calculates first extended duration ET1 (SP1−(CP1−DT1)−DT2) by subtracting a subtracting result (CNT1−PRDT) (a result corresponding to duration CP1−DT1) of the count signal CNT1 in the immediately preceding switching cycle and the first dead time information PRDT and the synchronous rectification dead time information SRDT from a duration SP1 counted from a rising edge (T31) of the first drive control signal PDRV1 in an immediately preceding switching cycle before the time T40 to a falling edge (T36) of the first conduction detection signal SRC1 in the immediately preceding switching cycle. The SR on-time compensator 232 decreases the first on-time compensation signal SRONC1 at time T47 which extends from time T46 by the first extended duration ET1.

Thus, the SR control signal generator 233 generates the first SR drive control signal SDRV1 to an enabled level (a high level) for duration T44-T47.

On-time TON4-DT2 is set to the on-time of the second synchronous rectification switch SR2 in a cycle after the time T40. After the second switch Q2 is turned on at time T48, the second conduction detection signal SRC2 is increased to a high level at time T49 as the second synchronous rectification switch SR2 is conducted, and the second synchronous rectification switch SR2 is turned on as the second on-time signal SRON2 and the second SR drive control signal SDRV2 are increased to a high level. The second on-time signal SRON2 is decreased to a low level at time T50 of elapsing time T49 by the on-time TON4-DT2.

The second drive control signal PDRV2 is increased at time T43, and the SR on-time compensator 232 calculates second extended duration ET2 (SP2−(CP1−DT1)−DT2) by subtracting a subtracting result (CNT1−PRDT) (a result corresponding to duration CP1−DT1) of the count signal CNT1 in the immediately preceding switching cycle and the first dead time information PRDT and the synchronous rectification dead time information SRDT from a duration SP2 counted from a rising edge (T37) of the second drive control signal PDRV2 in the immediately preceding switching cycle before the time T40 to a falling edge (T42) of the second conduction detection signal SRC2 in the immediately preceding switching cycle. The SR on-time compensator 232 decreases the second on-time compensation signal SRONC2 at time T52 which extends from the time T51 by the second extended duration ET2.

Thus, the SR control signal generator 233 generates the second SR drive control signal SDRV2 to an enabled level (a high level) for duration T49-T52.

As described above, as the turn-on duration of the first and second synchronous rectification switches according to the embodiment of the invention extends, conduction loss due to the body diodes BD3 and BD4 may be reduced.

Although a few embodiments of the invention have been shown and described, it would be appreciated by those skilled in the art that changes may be made in these embodiments without departing from the principles and spirit of the invention, the scope of which is defined in the claims and their equivalents.

DESCRIPTION OF SYMBOLS

1: RESONANT CONVERTER
Q1: FIRST SWITCH
Q2: SECOND SWITCH
20: TRANSFORMER
30: GATE DRIVE CIRCUIT
SR1: FIRST SYNCHRONOUS RECTIFICATION SWITCH
SR2: SECOND SYNCHRONOUS RECTIFICATION SWITCH
10: SWITCH CONTROL CIRCUIT
110: LLC CONTROLLER
120: DEAD TIME CONTROLLER
130: SYNCHRONOUS RECTIFICATION (SR) CONDUCTION DETECTOR
140: PRIMARY SIDE (PR) DRIVER
150: SR DRIVER
200: SYNCHRONOUS RECTIFICATION SWITCH CONTROLLER
210: MODE SELECTOR
211: LEVEL DETECTOR
212: LEVEL COUNTER
230: SYNCHRONOUS RECTIFICATION CONTROLLER
231: SR ON-TIME DETERMINER

232: SR ON-TIME COMPENSATOR
233: SR CONTROL SIGNAL GENERATOR

What is claimed is:

1. A resonant converter, comprising:
a first switch on a primary side and a second switch coupled to the first switch;
a first synchronous rectification switch on a secondary side configured to conduct according to a switching operation of the first switch;
a second synchronous rectification switch on the secondary side configured to conduct according to a switching operation of the second switch; and
a switch control circuit configured to detect a waveform of one end voltage of at least one of the first synchronous rectification switch and the second synchronous rectification switch, determine one of a below region and an above region of the detected waveform, and differently control conduction duration of the first and second synchronous rectification switches according to a result of the determination, wherein the switch control circuit comprises a mode selector configured to count changes in output detected by comparing the at least one end voltage with a predetermined threshold voltage and select a mode according to a counted result.

2. The converter of claim 1, wherein the switch control circuit is configured to determine an operation region of the resonant converter to be the below region when ringing of the at least one end voltage occurs, and determine the operation region of the resonant converter to be the above region when the ringing does not occur.

3. The converter of claim 1, wherein in the above region, the switch control circuit extends the conduction duration of the first and second synchronous rectification switches to a time later than an off time of the first and second switches, respectively.

4. The converter of claim 1, wherein the mode selector comprises:
a level detector configured to detect a waveform level of the at least one end voltage and output a result of comparing the detected waveform level with the threshold voltage; and
a level counter configured to select a first mode when it is determined that ringing has not occurred when the result of counting changes in output of the level detector is smaller than a predetermined value, and to select a second mode when it is determined that the ringing has occurred when the result of counting is equal to, or greater than the predetermined value.

5. The converter of claim 1, wherein the switch control circuit is configured to turn on the first synchronous rectification switch for a duration spanning from a conduction time of the first synchronous rectification switch to a time delayed from turn-off time of the first switch by a first extended duration calculated in an immediately preceding switching cycle, and turn on the second synchronous rectification switch for a duration spanning from a conduction time of the second synchronous rectification switch to a time delayed from turn-off time of the second switch by a second extended duration calculated in the immediately preceding switching cycle, when an operation region of the resonant converter is the above region.

6. The converter of claim 5, wherein the switch control circuit is configured to calculate the first extended duration by subtracting a first duration and a dead time between the first and second synchronous rectification switches from a duration spanning from a turn-on time of the first switch to a conduction end time of the first synchronous rectification switch, in which the first duration is calculated by subtracting a dead time of the first switch and a dead time of the second switch from a maximum on-time of the first switch.

7. The converter of claim 6, wherein the switch control circuit counts enabled duration of a clock signal to determine a switching frequency of the first and second switches, and the enabled duration of the clock signal corresponds to the maximum on-time of the first switch.

8. The converter of claim 5, wherein the switch control circuit is configured to calculate the second extended duration by subtracting a first duration and a dead time between the first and second synchronous rectification switches from a duration spanning from turn-on time of the second switch to a conduction end time of the second synchronous rectification switch, in which the first duration is calculated by subtracting dead time of the first and second switches from maximum on-time of the second switch.

9. The converter of claim 8, wherein the switch control circuit counts enabled duration of a clock signal which determines a switching frequency of the first and second switches, and the enabled duration of the clock signal corresponds to the maximum on-time of the second switch.

10. The converter of claim 1, wherein the switch control circuit comprises:
an SR on-time determiner configured to detect an end voltage of the first synchronous rectification switch and an end voltage of the second synchronous rectification switch, detect first conduction duration of the first synchronous rectification switch and second conduction duration of the second synchronous rectification switch in an immediately preceding switching cycle, and set an on-time of each of the first and second synchronous rectification switches in a next switching cycle based on a duration obtained as a result of subtracting second dead time between the first and second synchronous rectification switches from the detected first and second conduction duration; and
an SR on-time compensator configured to calculate a first extended duration by subtracting a first duration of the first synchronous rectification switch and the second dead time from a duration spanning from turn-on time of the first switch to a conduction end time of the first synchronous rectification switch, and calculate second extended duration in the immediately preceding switching cycle by subtracting a first duration of the second synchronous rectification switch and the second dead time from a duration spanning from turn-on time of the second switch to a conduction end time of the second synchronous rectification switch.

11. The converter of claim 10, wherein the SR on-time compensator is configured to calculate the first duration of the first synchronous rectification switch based on a duration obtained as a result of subtracting a first dead time of the first and second switches from a maximum on-time of the first switch in the immediately preceding switching cycle, and calculate the first duration of the second synchronous rectification switch based on a duration obtained as a result of subtracting the first dead time from maximum on-time of the second switch in the immediately preceding switching cycle.

12. The converter of claim 10, wherein the switch control circuit further comprises an SR control signal generator configured so that when the resonant converter operates in the above region, the SR control signal generator turns on the first synchronous rectification switch for a duration spanning from the conduction time of the first synchronous rectification switch until a time that is delayed from the turn-off time of the first switch by the first extended duration, and turns on the second synchronous rectification switch for a duration spanning from the conduction time of the second synchronous rectification switch until a time delayed from the turn-off time of the second switch by the second extended duration.

13. The converter of claim 12, wherein when the resonant converter operates in the below region, the SR control signal generator is configured to turn on the first synchronous rectification switch for a duration spanning from the conduction time of the first synchronous rectification switch to a time when the on-time of the first synchronous rectification switch set by the SR on-time determiner elapses, and turns on the second synchronous rectification switch for a duration spanning from the conduction time of the second synchronous rectification switch to a time when the on-time of the second synchronous rectification switch set by the SR on-time determiner elapses.

14. A method of driving a resonant converter which comprises a first switch and a second switch on a primary side, and a first synchronous rectification switch and a second synchronous rectification switch on a secondary side, the method comprising:
 synchronizing the operation of the first synchronous rectification switch with a turn-on of the first switch;
 synchronizing the operation of the second synchronous rectification switch with a turn-on of the second switch;
 detecting a waveform of one end voltage of at least one of the first and second synchronous rectification switches and determining whether an operation region of the resonant converter is one of a below region and an above region;
 differently controlling conduction duration of the first and second synchronous rectification switches according to a result of the determination;
 counting changes in output detected by comparing the at least one end voltage with a predetermined threshold voltage; and
 selecting a mode according to a counted result.

15. The method of claim 14, wherein determining whether an operation region of the resonant converter is one of the below region and the above region comprises:
 determining an operation region of the resonant converter to be the below region when ringing of the at least one end voltage occurs; and
 determining the operation region of the resonant converter to be the above region when the ringing does not occur.

16. The method of claim 14, wherein, when the operation region of the resonant converter is the above region, differently controlling conduction duration of the first and second synchronous rectification switches comprises extending the conduction duration of the first and second synchronous rectification switches to a time later than a corresponding off time of the first and second switches, respectively.

17. The method of claim 16, wherein, when the operation region of the resonant converter is the above region, differently controlling conduction duration of the first and second synchronous rectification switches further comprises turning on the first synchronous rectification switch for a duration spanning from a conduction time of the first synchronous rectification switch to a time delayed from a turn-off time of the first switch by a first extended duration calculated in an immediately preceding switching cycle.

18. The method of claim 17, wherein, when the operation region of the resonant converter is the above region, differently controlling conduction duration of the first and second synchronous rectification switches further comprises:
 calculating a first duration which is obtained as a result of subtracting a dead time of the first and second switches from a maximum on-time of the first switch; and
 calculating the first extended duration by subtracting the first duration and the dead time between the first and second synchronous rectification switches from a duration spanning from a turn-on time of the first switch to a conduction end time of the first synchronous rectification switch.

19. The method of claim 16, wherein, when the operation region of the resonant converter is the above region, differently controlling conduction duration of the first and second synchronous rectification switches further comprises turning on the second synchronous rectification switch for a duration spanning from a conduction time of the second synchronous rectification switch to a time delayed from a turn-off time of the second switch by a second extended duration calculated in an immediately preceding switching cycle.

20. The method of claim 19, wherein, when the operation region of the resonant converter is the above region, differently controlling conduction duration of the first and second synchronous rectification switches further comprises:
 calculating a first duration which is obtained as a result of subtracting a dead time of the first and second switches from a maximum on-time of the second switch; and
 calculating the second extended duration by subtracting the first duration and the dead time between the first and second synchronous rectification switches from a duration spanning from turn-on time of the second switch to conduction end time of the second synchronous rectification switch.

\* \* \* \* \*